US012083687B2

(12) United States Patent
Odhner et al.

(10) Patent No.: US 12,083,687 B2
(45) Date of Patent: Sep. 10, 2024

(54) EMPTY CONTAINER DETECTION

(71) Applicant: RightHand Robotics, Inc., Somerville, MA (US)

(72) Inventors: Lael Odhner, Medford, MA (US); Mark Keck, Woburn, MA (US); Yuli Friedman, Belmont, MA (US); Paul Novotny, Portsmouth, NH (US); Matthew Browne, Somerville, MA (US); Joel Brooks, Arlington, MA (US)

(73) Assignee: RightHand Robotics, Inc., Charlestown, MA (US)

( * ) Notice: Subject to any disclaimer, the term of this patent is extended or adjusted under 35 U.S.C. 154(b) by 593 days.

(21) Appl. No.: 17/298,930

(22) PCT Filed: Dec. 19, 2019

(86) PCT No.: PCT/US2019/067686
§ 371 (c)(1),
(2) Date: Jun. 30, 2021

(87) PCT Pub. No.: WO2020/132372
PCT Pub. Date: Jun. 25, 2020

(65) Prior Publication Data
US 2022/0032467 A1 Feb. 3, 2022

Related U.S. Application Data

(60) Provisional application No. 62/782,517, filed on Dec. 20, 2018.

(51) Int. Cl.
*B25J 9/16* (2006.01)
*B25J 13/08* (2006.01)
(Continued)

(52) U.S. Cl.
CPC ............. *B25J 9/1694* (2013.01); *B25J 13/08* (2013.01); *G01G 11/003* (2013.01); *G01N 21/84* (2013.01);
(Continued)

(58) Field of Classification Search
CPC ....... G01G 11/003; B25J 9/1694; B25J 13/08; B65G 1/137; G01N 21/84; G05B 2219/40269
See application file for complete search history.

(56) References Cited

U.S. PATENT DOCUMENTS

2007/0124020 A1    5/2007    Staples
2012/0113268 A1*   5/2012    Ito .................... H04N 5/2226
                                                           348/169
(Continued)

OTHER PUBLICATIONS

First Office Action for Chinese Patent Application No. 201980089518. 8, PCT/US2019/067686, Oct. 18, 2022, 5 pages.
(Continued)

*Primary Examiner* — Natalie Huls
(74) *Attorney, Agent, or Firm* — Danielson Legal LLC

(57) ABSTRACT

Devices, systems, and methods for determining whether a container is empty in the context of robotic picking solutions. The system includes a plurality of sensors configured to gather container data regarding a container at a first location, wherein the container data includes at least two of weight data related to the container, depth data related to the container, and color sensor data related to the container, and a processor configured to execute instructions stored on a memory to provide a sensor fusion module configured to process the received container data to determine whether the container is empty.

18 Claims, 5 Drawing Sheets

(51) Int. Cl.
*B65G 1/137* (2006.01)
*G01G 11/00* (2006.01)
*G01N 21/84* (2006.01)
*G05B 19/4155* (2006.01)

(52) U.S. Cl.
CPC .......... *G05B 19/4155* (2013.01); *B65G 1/137* (2013.01); *G05B 2219/40269* (2013.01)

(56) References Cited

U.S. PATENT DOCUMENTS

| | | |
|---|---|---|
| 2013/0223673 A1 | 8/2013 | Davis |
| 2015/0290805 A1* | 10/2015 | Morency ................ B25J 9/1679 700/99 |
| 2016/0364634 A1 | 12/2016 | Davis et al. |
| 2017/0066592 A1 | 3/2017 | Bastian, II et al. |
| 2017/0225330 A1* | 8/2017 | Wagner .................. B07C 3/008 |
| 2020/0094997 A1* | 3/2020 | Menon .................... B25J 9/1697 |
| 2020/0306980 A1* | 10/2020 | Choi ....................... B25J 9/1697 |
| 2020/0368923 A1* | 11/2020 | Tsukui ............... G05B 19/4183 |
| 2023/0303342 A1* | 9/2023 | Kulkarni .................. B07C 5/36 |
| 2023/0305574 A1* | 9/2023 | Ugalde Diaz .......... B25J 9/1697 |

OTHER PUBLICATIONS

Extended European Search Report for European Application No. 19897814.0, PCT/US2019/067686, Sep. 14, 2022, 10 pages.
International Search Report for PCT/US2019/067686, Apr. 9, 2020, 2 pages.
Written Opinion for PCT/US2019/067686, Apr. 9, 2020, 5 pages.

\* cited by examiner

EMPTY CONTAINER DETECTION

CROSS REFERENCE TO RELATED APPLICATIONS

The present application is the national phase of International (PCT) Patent Application No. PCT/US2019/067686, filed internationally on Dec. 19, 2019, and claims the benefit of and priority to U.S. provisional application No. 62/782,517, filed on Dec. 20, 2018, the entire disclosure of which is hereby incorporated by reference as if set forth in its entirety herein.

TECHNICAL FIELD

Embodiments described herein generally relate to detecting the contents of a container and, more specifically, to the use of sensors to gather data regarding the emptiness of a container.

BACKGROUND

Logistic operations such as those in warehouse environments often use robotic picking devices to gather items from a container and place the items at a different location (e.g., a conveyor belt) or vice versa. In these existing techniques or environments, a robotic device generally picks items from a container until the container is empty. A person must then manually confirm the container is empty (i.e., that all items have been picked from the container), and then switch the picking device to another container or bring another full container to the picking device. This manual intervention inevitably consumes time and results in a halt in production.

A need exists, therefore, for methods and systems that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of detecting whether a container is empty. The method includes receiving a container at a first location; receiving container data from a plurality of sensors, wherein the container data includes at least two of weight data related to the container, depth data related to the container, and color sensor data related to the container; processing, using a processor executing instructions stored on memory to provide a sensor fusion module, the received container data to determine whether the container is empty; and autonomously removing the container from the first location upon the sensor fusion module determining the container is empty.

In some embodiments, the method further includes perturbing the container, determining that the container is not empty after perturbing the container, and removing at least one item from the container after determining that the container is not empty.

In some embodiments, the method further includes generating a confidence score regarding a likelihood the container is empty, wherein the confidence score is based on the received container data.

In some embodiments, the method further includes perturbing the container upon determining the confidence score is less than a predetermined threshold, gathering a second set of data regarding the perturbed container, and analyzing the second set of data to generate a second confidence score regarding a second likelihood the container is empty. In some embodiments, the container is on a conveyor belt and the method further includes moving the container with the conveyor belt from the first location to a second location upon determining the confidence score is greater than a predetermined threshold.

In some embodiments, the method further includes detecting that the container is present at the first location.

In some embodiments, a plurality of sensors are used to provide at least two of the weight data, the depth data, and the color sensor data, and the plurality of sensors are collocated with a robotic picking device.

In some embodiments, the method further includes comparing the received container data to at least one of known weight data of the container or known appearance data of the container stored on memory to determine whether the container is empty.

In some embodiments, the method further includes using a sensing modality to detect items at least 0.5 cm in length in all principal directions.

In some embodiments, the method further includes grasping and shaking the container with a robotic picking device to move an item in the container.

According to another aspect, embodiments relate to a system for detecting whether a container is empty. The system includes a plurality of sensors configured to gather container data regarding a container at a first location, the container data including at least two of weight data related to the container, depth data related to the container, and color sensor data related to the container; and a processor configured to execute instructions stored on memory to provide a sensor fusion module configured to process the received container data to determine whether the container is empty.

In some embodiments, the system further includes a picking device to perturb the container. In some embodiments, the picking device is further configured to grasp the container to move an item in the container.

In some embodiments, wherein the memory stores at least one of known weight data and known appearance data, and the processor is configured to compare the stored data to the received container data to determine whether the container is empty.

In some embodiments, the container is located on a conveyor belt and the conveyor belt is configured to move the container from the first location to a second location upon the sensor fusion module determining that the container is empty.

In some embodiments, the processor is further configured to generate a confidence score regarding a likelihood the container is empty. In some embodiments, the processor is further configured to send a signal to perturb the container upon determining the confidence score is less than a predetermined threshold; gather, with the plurality of sensors, a second set of data regarding the perturbed container; analyze the second set of data; and generate a second confidence score regarding a second likelihood the container is empty.

In some embodiments, the system further includes an interface configured to communicate with at least one picking device.

In some embodiments, the plurality of sensors are collocated on a picking device.

In some embodiments, the plurality of sensor devices include a plurality of interconnected sensor devices.

BRIEF DESCRIPTION OF DRAWINGS

Non-limiting and non-exhaustive embodiments of the embodiments herein are described with reference to the following figures, wherein like reference numerals refer to like parts throughout the various views unless otherwise specified.

DETAILED DESCRIPTION

Figure 1:
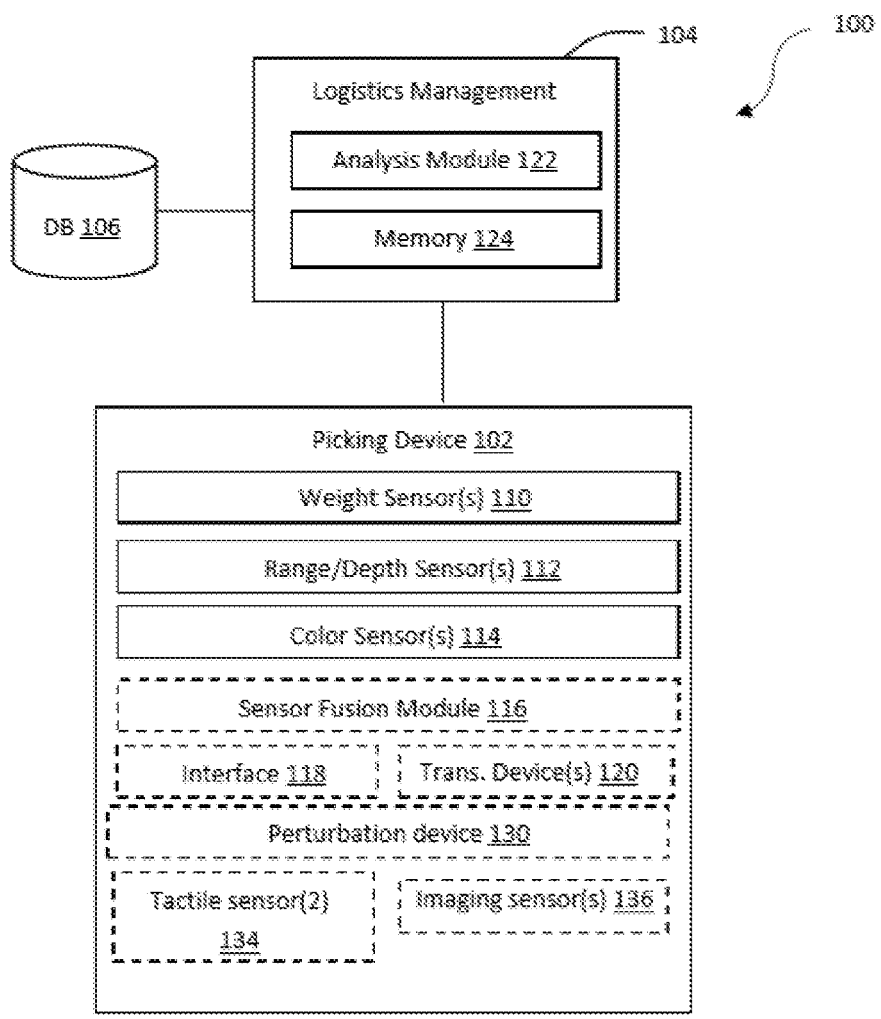
FIG. 1 illustrates a system for detecting whether a container is empty in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily referring to the same embodiments.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein provide novel detection systems, methods, and devices. Specifically, the embodiments described herein provide automatic systems and methods for detecting whether a container is empty. The systems and methods described herein may work in conjunction with any type of rigid or semi-rigid type of tote, container, box, bin, or the like (for simplicity, "container"), whether partitioned or not.

The systems and methods described herein may rely on at least two of weight data related to the container, depth data related to the container, and color data related to the container. A sensor fusion module may then combine and process the gathered data to determine whether the container is empty. If the sensor fusion module determines the container is empty, the system may take steps to, e.g., automatically remove the container from the proximity of a robotic picking device and deliver a new, non-empty container to the robotic picking device (or move the robotic picking device to a new, non-empty container).

The systems and methods described herein may be implemented in environments such as in logistic warehouses or other similar locations and work in conjunction with a variety of different types of containers filled with items, partly filled with items, or empty, either as a whole or in individual partitions within the container.

FIG. 1 presents a diagram of a system 100 for detecting whether a container is empty in accordance with one embodiment. The system 100 may include a picking device 102 in communication with a logistics management module 104 and a database 106. In some embodiments, the logistics management module 104 may constitute computer-executable instructions executed by a processor. In some embodiments, the logistics management module 104 may include the database 106 stored in the memory 124 of the logistics management module 104.

The picking device 102 may be similar to the picking devices of FIGS. 2 and 3, as described in more detail below. The picking device 102 may include a plurality of sensors configured to gather container data regarding a container located at a first location, such as weight sensor(s) 110, range/depth sensor(s) 112, and color camera sensor(s) 114. The container data may be gathered by at least two of weight sensor(s) 110, range/depth sensor(s) 112, color sensor(s) 114; and may also be gathered by a sensor fusion module 116, as described in more detail below.

The plurality of sensor(s) 110, 112, and 114 may be collocated on the picking device 102 or otherwise at a location in proximity to the picking device 102 to gather data regarding containers at or near the picking device 102. In some embodiments, the sensor(s) 110, 112, and 114 may be interconnected sensors. The picking device 102 may further include an interface 118 to communicate with other devices and/or systems, and may also include one or more transportation device(s) 120. The picking device 102 may also include one or more perturbation device(s) 130. In some embodiments, the transportation device(s) 120 and the perturbation device(s) 130 may be the same device(s).

In some cases, such as those in which the maximum weight to consider for any object or item potentially in the container is greater than some threshold (e.g., 30 grams), a weight sensor 110 such as a scale may be sufficient to detect whether or not a container contains an item.

In some environments, the weight sensor(s) 110 can be integrated into conveyor belt systems or picking stations. These weight sensor(s) 110 may be in further communication with computers or other hardware or processing components, including the logistics management module 104, via the interface 118.

In some embodiments, the empty weight of a container may be known apriori. The logistics management module 104 may provide this data by relying on data stored in one or more databases 106.

When a container arrives at a picking location, the sensor fusion module 116 or some other analysis module 122 executing instructions stored on memory 124 may receive and process container data to determine whether the container is empty. In some embodiments, the sensor fusion module 116 executes instructions such as instructions to compare the detected weight of the container from the weight sensor(s) 110 to the known weight of an empty version of the same type of container stored in the database 106 or otherwise in the memory 124. If the weight of the arriving container is higher than the known empty weight, the container may be classified as non-empty.

In some embodiments, the database(s) 106 may store data regarding the known appearance of a container and the weight of that container. For example, the database(s) 106 may also include the color of the bottom of the container when the container is empty, the sound of the container when the container is empty, the depth of the container when the container is empty, and/or other features regarding the container when it is empty.

In some embodiments, the system 100 may use a sensor fusion module 116 to process detected items at least 0.5 cm in length in all principal directions. In some embodiments, the sensor fusion module 116 may process detected items at least 0.3 cm in length in all principal directions. In some embodiments, the sensor fusion module 116 may process detected items at least 0.7 cm in length in all principal directions.

In some situations, such as those in which the items are light enough that the weight sensor(s) 110 cannot reliably detect them or small enough that range/depth sensors 112 cannot reliably detect them, the system 100 may rely on a combination of sensors 110, 112, and 114 and the sensor fusion module 116, in optional combination with a perturbation device 130 to determine if the container is empty. In some embodiments, the range/depth sensor(s) 112 (for simplicity, "depth sensors 112") can detect lightweight items that are not reliably detectable by the weight sensor(s) 110 alone. The depth sensors 112 can detect items in a container provided the items are not oriented in a way that makes them appear very thin when viewed by one depth sensor 112. For example, a credit card or a matchbook may, in certain orientations, appear very thin. However, a plurality of depth sensors 112 can detect items that are, for example, at least 0.5 cm in one or more principal dimensions.

The number of depth sensors 112 deployed may vary depending on size, weight, power, computing hardware, or cost constraints. For example, in some embodiments, a single off-the-shelf (OTS) depth sensor such as the Microsoft Kinect® could be mounted above the container area to capture imagery of the containers as they are presented to the robotic picking device 102. In this configuration, the depth sensor(s) 112 may be mounted high enough to image the entire container interior, but close enough to adequately sense items therein and discriminate between the items and the container itself.

In other embodiments, there may be an array of depth sensors 112 to compute a high-fidelity, three-dimensional (3D) reconstruction of the container's interior. This enables high precision detection, but at a higher financial, integration, and computation cost. The array of depth sensors 112 may be mounted about the top of the container looking inward, or along the bottom of the container to easily detect if there is anything close to the depth sensors 112.

Regardless of the exact configuration of the depth sensors 112, the sensor fusion module 116 may execute geometric and/or image processing algorithms to detect whether the container is empty. Assuming the container geometry is known a priori, these algorithms can reconstruct the full 3D space viewed by the depth sensors 112, and the sensor fusion module 116 can localize that space using object matching algorithms such as iterative closest point (ICP). In some embodiments, the logistics management module 104 and the database 106 may be incorporated into the sensor fusion module 116 and may be co-located on the picking device 102.

Once the container space is localized, deviations from the expected bottom and/or the walls of the container interior can be used to classify the container as empty or non-empty. This may be done using simple geometric reasoning or, assuming the availability of multiple images with manually-determined classification labels of "empty" or "non-empty", the sensor fusion module 116 can use machine learning techniques, convolutional neural networks, and/or supervised learning algorithms including deep learning techniques to learn how to classify the container.

The color camera sensor(s) 114 (for simplicity, "color sensors 114") may also provide informative data to assist in item detection. Similar to the depth sensors 112, color sensors 114 may provide observability into nearly all of the interior of the container.

Given a set of calibrated color sensors 114 that provide observability into the container, a number of image processing methods can be employed to detect items in the container that are otherwise undetectable. For instance, the sensor fusion module 116 may use vision techniques such as background subtraction and segmentation to find objects that do not look like the container when the container is empty. Additionally or alternatively, the sensor fusion module 116 may use deep learning-based methods to generate candidate items to be grasped from the container.

The sensor fusion module 116 or some other analysis module 122 executing instructions stored on a memory 124 or in the database 106 may fuse the data from at least two of the weight sensor(s) 110, the depth sensors 112, and the color sensors 114 to determine whether the container is empty. In some embodiments, data from only one of the sensors may be required.

The sensor fusion module 116 may rely on simple heuristics (e.g., if any of the sensors detects emptiness, the sensor fusion module 116 will declare the container empty). However, if the noise properties of a plurality of sensors are correlated with one another in time or in some other latent variable, the sensor fusion module 116 may rely on a more rigorous method for processing the gathered data. For example, in some cases, the sensor fusion module 116 may use Bayesian reasoning to model and account for any correlations between the various sensors. The sensor fusion module 116 may, for example, model the different processes as binary random variables derived from a hierarchical Dirichlet process and determine the correlation in those variables via the estimated mixing parameters. The sensor fusion module 116 may also execute deep learning techniques and combine data from the sensors as multiple inputs to a neural network. The sensor fusion module 116 may then learn a classification function to combine the two or more data inputs. The optimal choice may depend on the sensor configuration, fidelity of a priori information (e.g., container models and stored data thereof), and data/labelling quality.

In some cases, the processing algorithms may generate a confidence score regarding the likelihood that the container is empty based on received container data. In some cases, the processing algorithm may generate only a low-confidence estimate of the state of the container (i.e., whether or not the container is empty). This may occur when small, lightweight objects are near container edges or corners, or when there is insufficient lighting, for example. In some embodiments, when the processing algorithms are not confident regarding whether the container is empty (e.g., an outputted confidence value is below some threshold), the perturbation device 130 of the robotic picking device 102 may perturb the container. The transportation device 120 of the picking device 102 may be used as a perturbation device 130 in some embodiments.

For example, the picking device 102 may grasp and shake the container to move items potentially therein by itself or in conjunction with the perturbation device 130 or the transportation device 120. The picking device 102 may grasp items in the container by itself or in conjunction with the perturbation device 130 or the transportation device 120. The picking device 102 may additionally or alternatively reach directly into the container near areas where the processing algorithms were unable to confidently determine if an object is present. The tactile sensor(s) 134 or imaging sensor(s) 136 with additional lighting coupled to the imaging sensor(s) 136 may attempt to sense at higher fidelity (e.g., closer to these areas or closer to a potential object) to determine if an item is present.

If such sensing is not available, the system 100 may perturb, manipulate or otherwise move a potential item with a perturbation device 130 to more easily to determine whether the container is empty. In some embodiments, the container may be perturbed from its side or bottom by a perturbation device 130. Once the container is perturbed, the appropriate sensors can reacquire data and the processing algorithms can execute again to generate a score. This process may iterate in some embodiments until a confident determination is made.

As discussed above, the confidence score returned may need to be above a predetermined threshold before the system 100 determines the container may be empty. In some embodiments, if the calculated confidence score is below the predetermined threshold, the system 100 may gather a second set of data. As discussed above, the system 100 may perturb the container with a perturbation device 130 or the transportation device 120 and then gather a second set of data regarding the perturbed container. The system 100 may then calculate a second confidence score. If the second confidence score is higher than the predetermined threshold, the system 100 may determine that the container is empty.

The system 100 may move a container from one location to another upon determining that the container is empty. For example, if the container is on a conveyor belt and the system determines that the container is empty, the system may control the conveyor belt to move the container to a storage location. In some embodiments, the system 100 may move the empty container to a second conveyor belt or to a second location to be re-filled with more items.

In some embodiments, if the second confidence score is lower than the predetermined threshold, the system may alert a person to manually verify if the container is empty. Additionally or alternatively, the system 100 may repeat the data gathering process.

Robotic picking devices may be tasked with picking items from containers and/or tasked with placing items in containers. For example, FIG. 2 illustrates an exemplary warehouse environment 200 that may employ these types of robotic picking devices. As seen in FIG. 2, a robotic picking device 202 may be tasked with picking items from a container 204.

Figure 2:
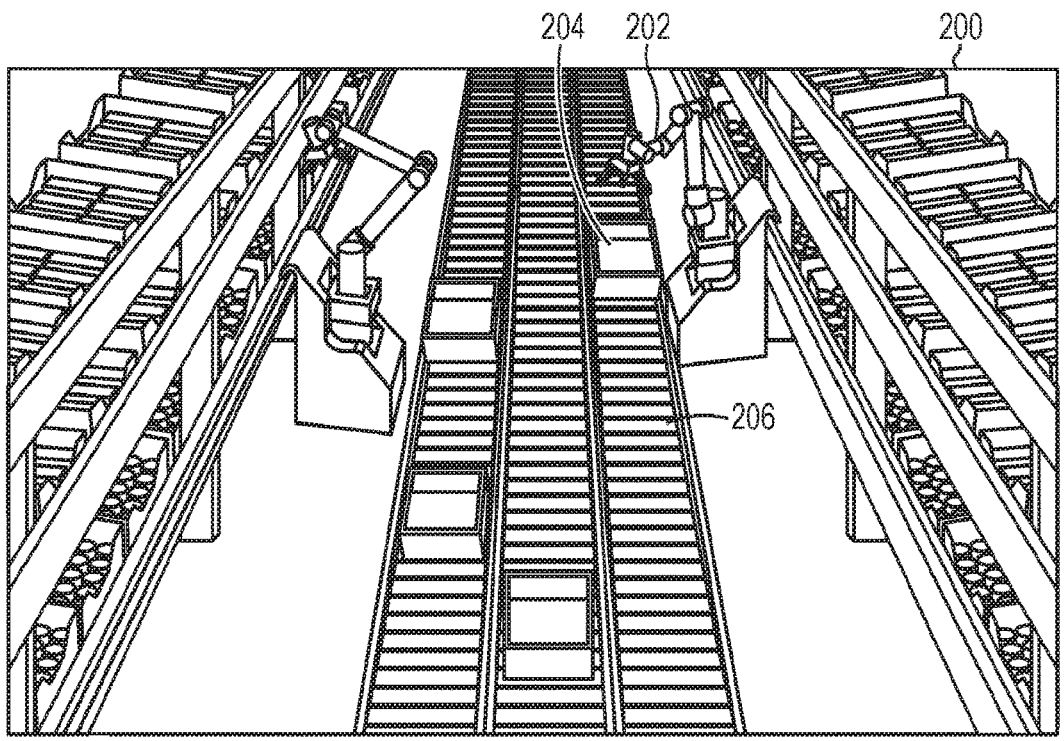
FIG. 2 illustrates robotic picking devices performing picking operations in accordance with one embodiment.

Although FIG. 2 depicts an open container 204, robotic picking devices may pick items from different types of containers. The containers may have partitions or no partitions. In some partitioned bins, only some of the partitions may include items for picking. In some embodiments, all partitions within a bin may include items for picking. The containers may include any type of rigid or semi-rigid container. Other types of containers in addition to or in lieu of these may be used in conjunction with the systems and methods described herein.

In some embodiments, the container 204 may be located on a conveyor belt 206, for example. In some embodiments, the conveyor belt 206 may be moving when the robotic picking device 202 is picking items from the container 204. In some embodiments, the conveyor belt 206 may stop when the robotic picking device 202 is picking items from the container 204.

There may be scenarios in which it is unclear whether the container 204 is empty (e.g., whether all items in the container 204 have been picked). In these instances, the robotic picking device 202 may grasp and shake the container 204 to move any items potentially in the container. A sensor may detect noise, visual motion, or vibrations caused by item moving as a result of the robotic picking device's action and may send a signal indicating that the container 204 is not empty.

Figure 3:
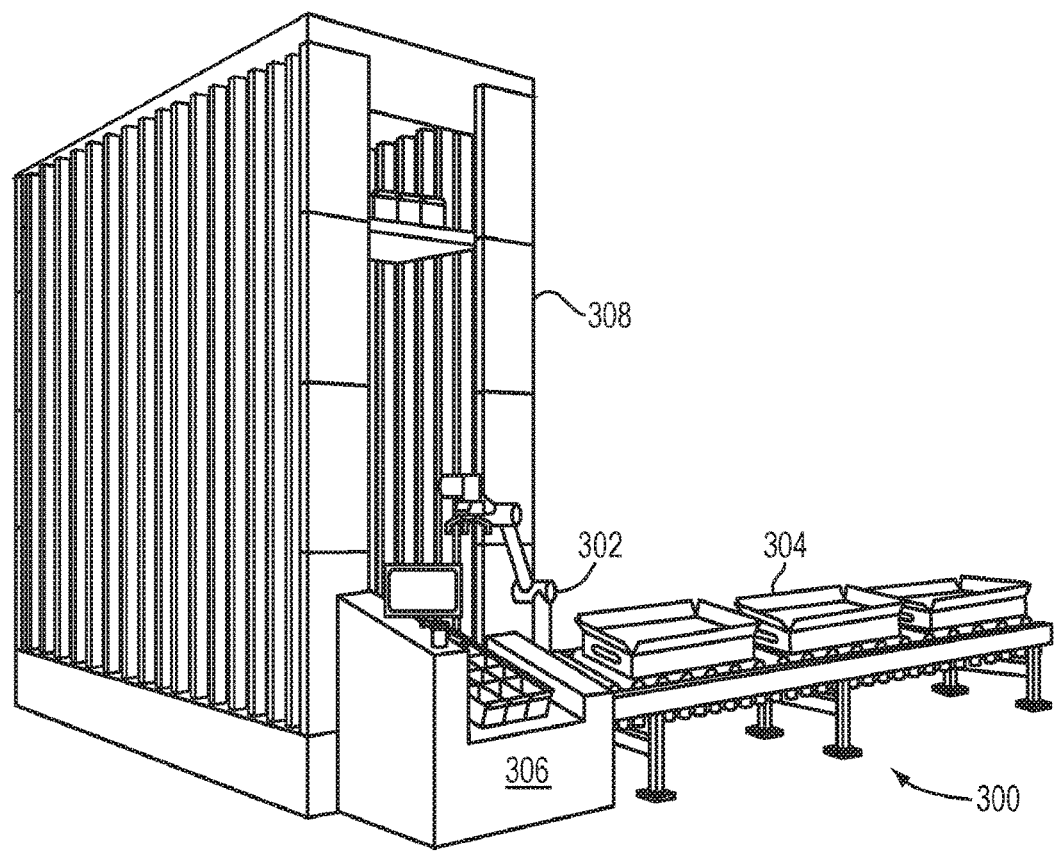
FIG. 3 illustrates a robotic picking device performing a picking operation in accordance with one embodiment.

FIG. 3 illustrates another exemplary environment 300, in which a robotic picking device 302 is tasked with picking items from containers 304. These items may be placed in a location such as a container loading location 306 and/or a shipping container 308 for further shipment or processing.

The system may include a set of sensors (e.g., scales, range cameras, RGB cameras) or the like, and execute novel processing algorithms to fuse data from these sensor modalities to determine if a container is empty as discussed above. The sensors used may include any type of cameras (e.g., visible spectrum, infrared, hyperspectral, depth, etc.) that are statically mounted on or attached to an end effector (i.e., a hand portion) of the picking device.

Figure 6:
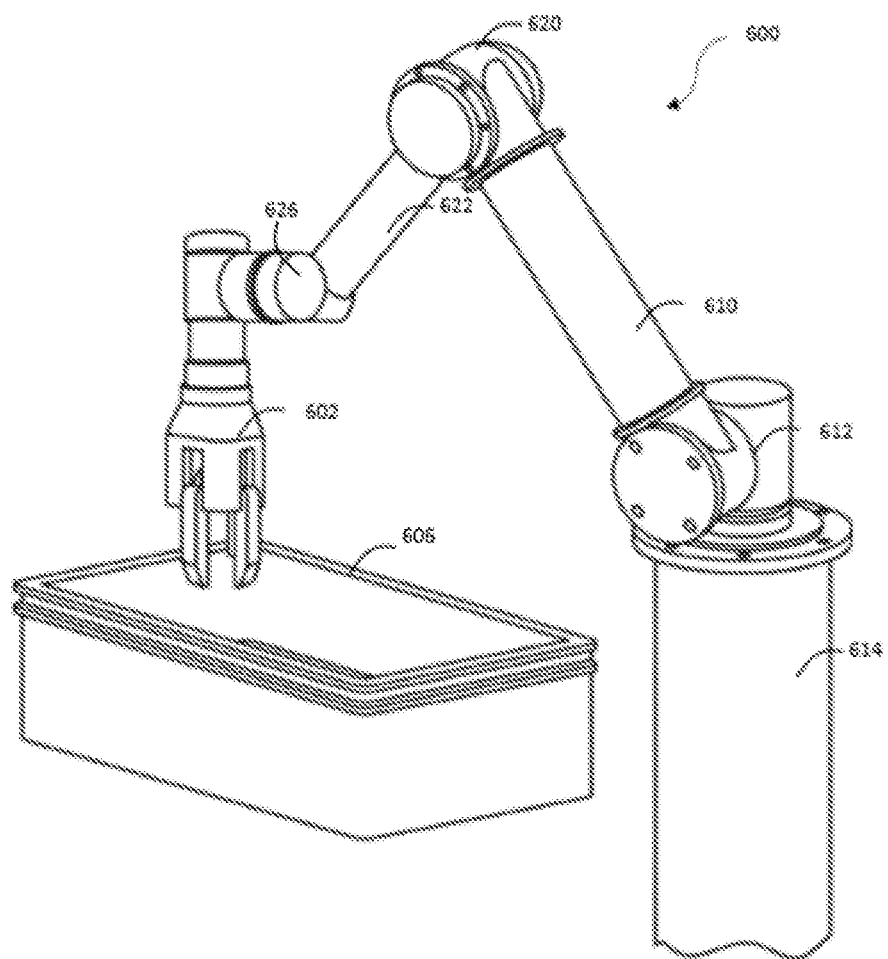
FIG. 6 depicts a robotic picking device performing a perturbation in accordance with one embodiment.

As discussed above, embodiments described herein may combine data from RGB cameras, range sensors, weight sensors, depth sensors, or the like, and execute various vision processing and/or machine learning procedures to determine whether a container is empty. Each sensing modality may also be used to detect the presence of the container. An exemplary embodiment of a system configured to determine whether a container is empty is shown in FIG. 6 and described in more detail below.

As discussed previously, the systems and methods described herein may use a perturbation device to perturb the container (or items potentially therein) and may use a sensor to determine, as a result of the perturbation, whether the container is empty. In some embodiments, the picking device 302 may serve as the perturbation device. Additionally or alternatively, the perturbation device may be located on the conveyor belt, under the container, or otherwise separate from the robotic picking device.

In some embodiments, a sensor may detect a sound as a result of perturbation, wherein the sound indicates that the container is not empty. Additionally or alternatively, a sensor may detect a vibration from the perturbation, wherein the vibration indicates that the container is not empty. Additionally or alternatively, a sensor may detect movement within the container, wherein movement indicates the container is not empty. In some embodiments, values from one or more of these sensors may be combined using various algorithms to determine whether the container is empty.

In some embodiments, the system may determine that the container is not empty (whether the result of perturbation or without requiring perturbation). If the system determines the container is not empty, the picking system may continue to pick items from the container until the system determines the container is empty.

Once the sensors and any associated processing devices detect that a container is empty, the system may perform some action such as moving a conveyor belt so that a new, non-empty container is presented to the robotic picking device. Or, in other embodiments, the system may move the picking device to a new, non-empty container. The robotic picking device may continue to perform its picking-related tasks with respect to the new container.

Figure 4:
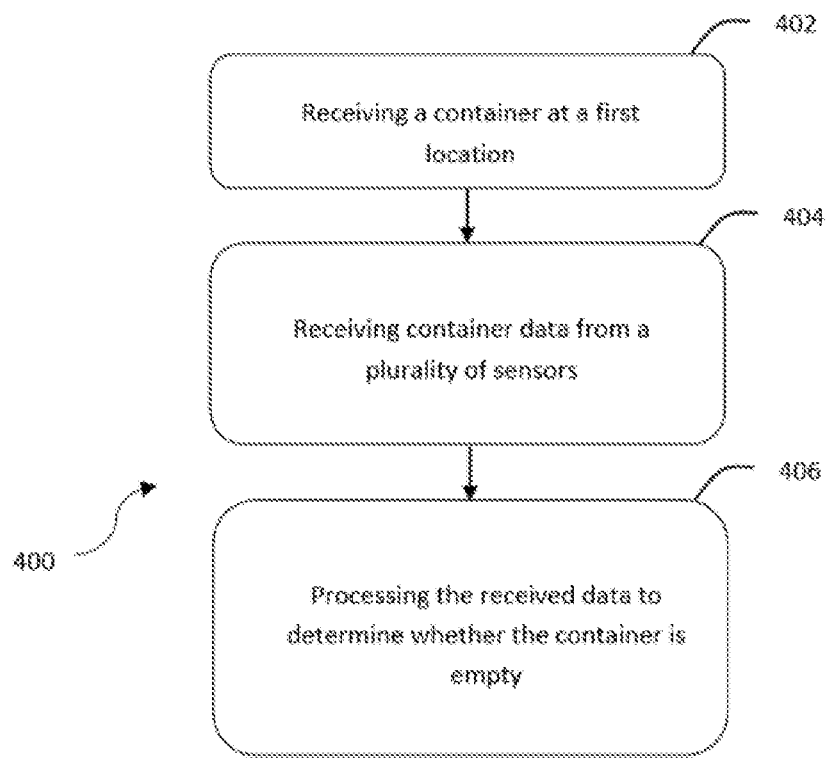
FIG. 4 depicts a flowchart of a method for detecting whether a container is empty in accordance with one embodiment.

FIG. 4 depicts a flowchart of a method 400 of detecting whether a container is empty in accordance with one embodiment. Step 402 involves receiving a container at a first location. This location may be a picking location in proximity to a robotic picking device. In some embodiments, the system may detect that the container is present at the first location.

Step 404 involves receiving container data from one or more sensors configured to gather container data regarding a container at a first location. In some embodiments, the sensors are configured to gather container data regarding at least two of weight data related to the container, depth data related to the container, and color sensor data related to the container. In some embodiments, the sensors may comprise at least one depth imaging sensor, at least one color sensor, and at least one weight scale sensor. One sensor may be configured to gather at least two types of data. These sensors may each provide data regarding the container that may be used to determine whether the container is empty. In some embodiments, these sensors may send the data to a processor.

Step 406 a processor executing instructions stored on memory to provide a sensor fusion module to process the received container data to determine whether the container is empty. The sensor fusion module may execute any one or more of the techniques discussed above to determine whether the container is empty.

Figure 5:
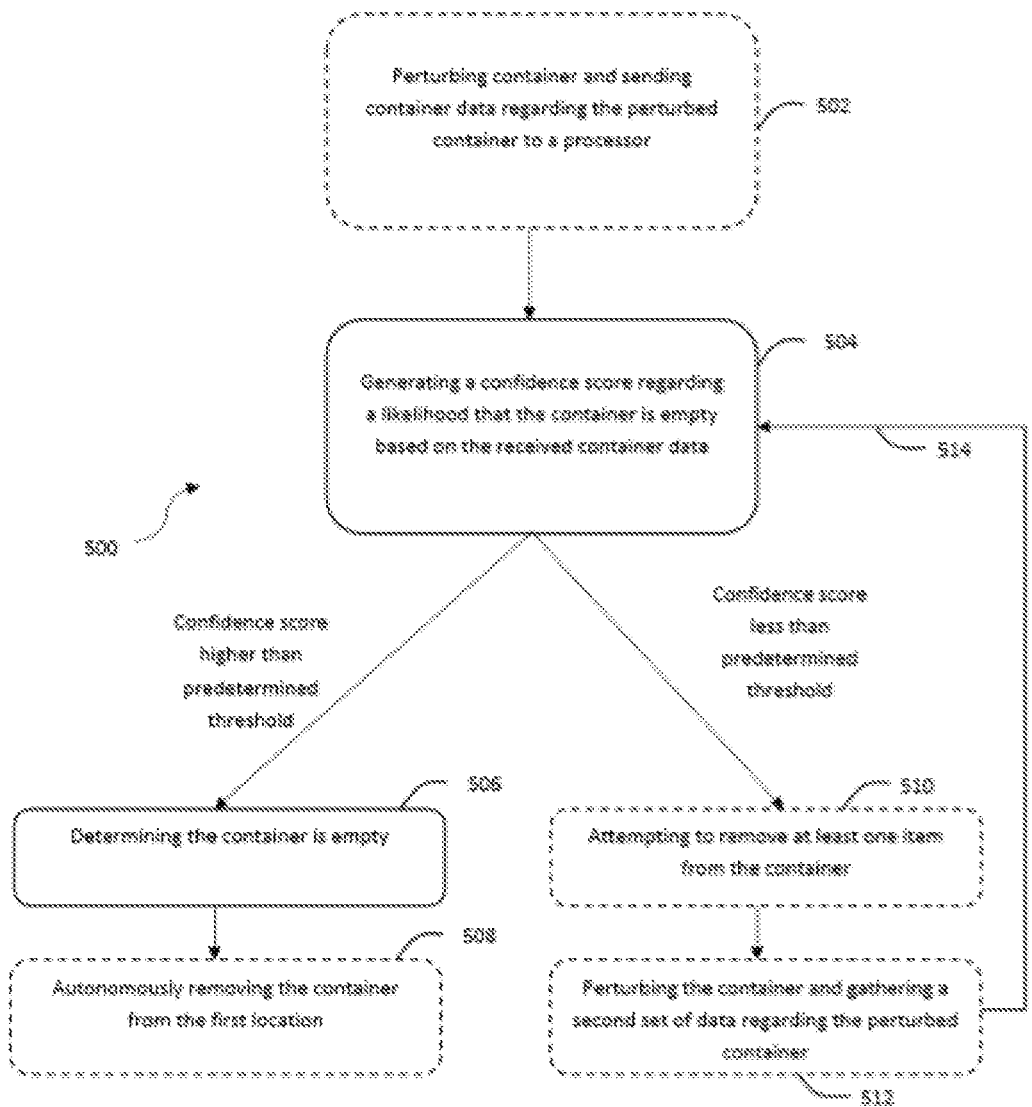
FIG. 5 depicts a flowchart of a method for interacting with a container based on a generated confidence score in accordance with one embodiment.

FIG. 5 depicts a flowchart of a method 500 for interacting with a container based on a generated confidence score. Step 502 is optional and involves perturbing the container and sending data regarding the perturbed container to a processor. In some embodiments, the container may be perturbed by a picking device such as if the picking device grasps the container to perturb the container. In some embodiments, the container may be perturbed by a second device. In some embodiments, a system executing the method of FIG. 5 may use a processor to receive data about the perturbed container, such as the sound of the container when the container is perturbed, any movement in the container when the container is perturbed, or any vibrations from the container when the container is perturbed.

Step 504 involves generating a confidence score based on received data to determine whether the container is empty. In some embodiments, the confidence score may be based on data received in step 502. In some embodiments, the confidence score may be based on at least two of the weight, depth, and color data associated with the container. In some embodiments, the confidence score may be based on the weight, depth, color, or the sound of the container when the container was perturbed, or any combination thereof.

Some embodiments may analyze the received data with a processor. In some embodiments, the processor may generate a confidence score higher than a predetermined threshold. A confidence score higher than a predetermined threshold may indicate that the container is empty (Step 506). In optional step 508, the system executing the method shown in FIG. 5 may autonomously remove the container from the first location upon determining that the container is empty. In step 508, a conveyor belt may move the container from the first location to a second location. In some embodiments, a picking device, such as the robotic picking device 302 of FIG. 3, may move the container from a first location to a second location, such as storage for empty containers. In some embodiments, step 508 may involve a device autonomously taking the empty container to a second location to be re-filled with items.

FIG. 6 depicts a robotic picking device 600 performing a perturbation operation in accordance with one embodiment. In some embodiments, a robot picking device may have a base 614 and a plurality of arm segments 610, 622 connected at pivots 612, 620, and 626 to move the device 600. In some embodiments, a head portion 602 may include grips to perturb an item in a container 606. In some embodiments, the head portion 602 may have complete translational and rotational freedom. The robotic picking device 600 may perturb an item in the container 606 by lowering the head portion 602 into the container 606, and moving the head 602 horizontally or vertically therein. Grips of the head portion 602 may also grasp the edge of the container 606 and shake the container 606 to determine if items remain in the container 606. Grips of the head portion 602 may also grasp an item in the container 606 and remove the item from the container 606. In some embodiments, a sensor may be located in the base 614 of the robotic picking device 600 or along the arm of the robotic picking device 600. The sensor may send data to a processor to generate a confidence score that the container 606 is empty based on the received data, as described in FIG. 5 above.

In some embodiments, the processor may generate a confidence score that is lower than a predetermined threshold. A confidence score lower than a predetermined threshold may indicate that the container is not empty or that the system executing the method shown in FIG. 5 cannot reliably determine that the container is empty. In this case, method 500 may proceed to step 510 which involves attempting to remove at least one item from the container. Step 512 then involves perturbing the container and gathering a second set of data regarding the perturbed container. In some embodiments, data gathered in step 512 may include at least one of the sound the container makes when the container is perturbed, any vibrations from the container when the container is perturbed, any visually-detected movement when the container is perturbed, or any combination thereof. In some embodiments, when the system executing the method shown in FIG. 5 gathers a second set of data regarding the perturbed container, the system may then repeat step 504, as shown by step 514, to generate a second confidence score based on the received data.

In some embodiments, if the process takes too long or the confidence score is lower than a predetermined threshold for a certain number of iterations, the container may be manually checked to determine whether the container is empty.

The methods, systems, and devices discussed above are examples. Various configurations may omit, substitute, or add various procedures or components as appropriate. For instance, in alternative configurations, the methods may be perform ed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of detecting whether a container is empty, the method comprising:
   receiving a container at a first location;
   receiving container data from a plurality of sensors, wherein the container data includes at least two of:
   weight data related to the container,
   depth data related to the container, and
   color sensor data related to the container;
   processing, using a processor executing instructions stored on memory to provide a sensor fusion module, the received container data to determine whether the container is empty by generating a confidence score regarding a likelihood that the container is empty, wherein the confidence score is based on the received container data; and
   autonomously removing the container from the first location upon the sensor fusion module determining the container is empty.

2. The method of claim 1, further comprising:
   perturbing the container;
   determining that the container is not empty after perturbing the container; and
   removing at least one item from the container after determining that the container is not empty.

3. The method of claim 1, further comprising:
   perturbing the container upon determining the confidence score is less than a predetermined threshold;
   gathering a second set of data regarding the perturbed container; and
   analyzing the second set of data to generate a second confidence score regarding a second likelihood the container is empty.

4. The method of claim 1, wherein the container is on a conveyor belt, and the method further includes moving the container with the conveyor belt from the first location to a second location upon determining the confidence score is greater than a predetermined threshold.

5. The method of claim 1, further comprising detecting that the container is present at the first location.

6. The method of claim 1, wherein the plurality of sensors are used to provide at least two of the weight data, the depth data, and the color sensor data, and the plurality of sensors are collocated with a robotic picking device.

7. The method of claim 1, further comprising comparing the received container data to at least one of known weight data of the container or known appearance data of the container stored on the memory to determine whether the container is empty.

8. The method of claim 1, further comprising using a sensing modality to detect items at least 0.5 cm in length in all principal directions.

9. The method of claim 1, further comprising grasping and shaking the container with a robotic picking device to move an item in the container.

10. A system for detecting whether a container is empty, the system comprising:
    a plurality of sensors configured to gather container data regarding a container at a first location, wherein the container data includes at least two of:
    weight data related to the container,
    depth data related to the container, and
    color sensor data related to the container; and
    a processor configured to:
    execute instructions stored on memory to provide a sensor fusion module configured to generate a confidence score regarding a likelihood that the container is empty, wherein the confidence score is based on the received container data.

11. The system of claim 10, further comprising a picking device configured to perturb the container.

12. The system of claim 11, wherein the picking device is further configured to grasp the container to move an item in the container.

13. The system of claim 10, wherein the memory stores at least one of known weight data and known appearance data, and the processor is configured to compare the stored data to the received container data to determine whether the container is empty.

14. The system of claim 10, wherein the container is located on a conveyor belt and the conveyor belt is configured to move the container from the first location to a second location upon the sensor fusion module determining that the container is empty.

15. The system of claim 10, wherein the processor is further configured to:
   send a signal to perturb the container upon determining the confidence score is less than a predetermined threshold;
   gather, with the plurality of sensors, a second set of data regarding the perturbed container;
   analyze the second set of data; and
   generate a second confidence score regarding a second likelihood the container is empty.

16. The system of claim 10 further comprising an interface configured to communicate with at least one picking device.

17. The system of claim 10, wherein the plurality of sensors are collocated on a picking device.

18. The system of claim 10, wherein the plurality of sensors include a plurality of interconnected sensors.

\* \* \* \* \*